Oct. 14, 1947.   L. D. MYERS   2,429,027
EDUCATIONAL TOY
Filed March 24, 1945   2 Sheets-Sheet 1
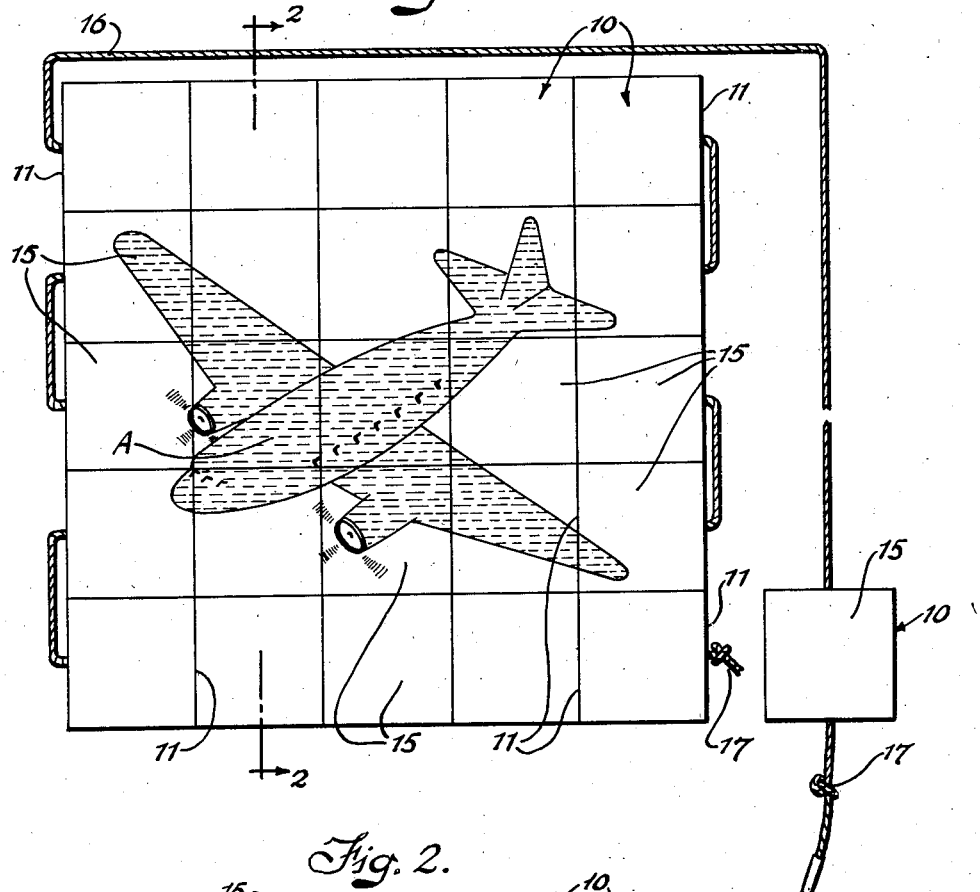
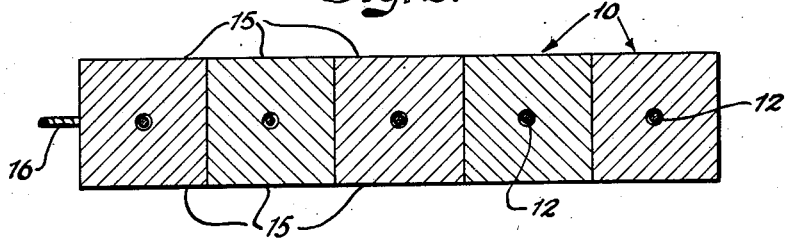
Inventor
Lloyd. D. Myers
By Clarence A. O'Brien
and Harvey B. Jacobson
Attorneys Oct. 14, 1947.  L. D. MYERS  2,429,027
EDUCATIONAL TOY
Filed March 24, 1945  2 Sheets-Sheet 2
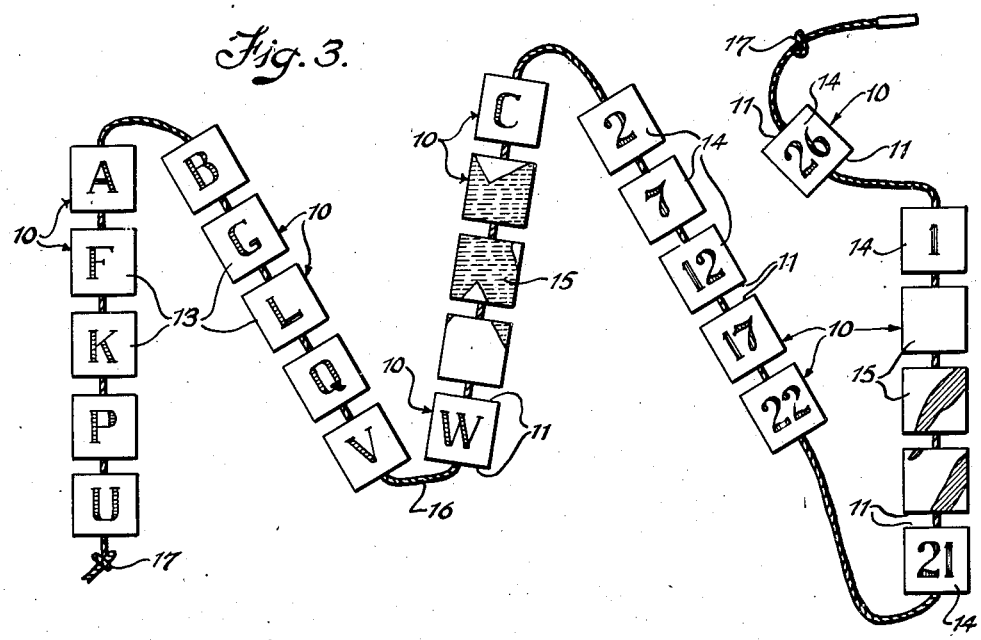
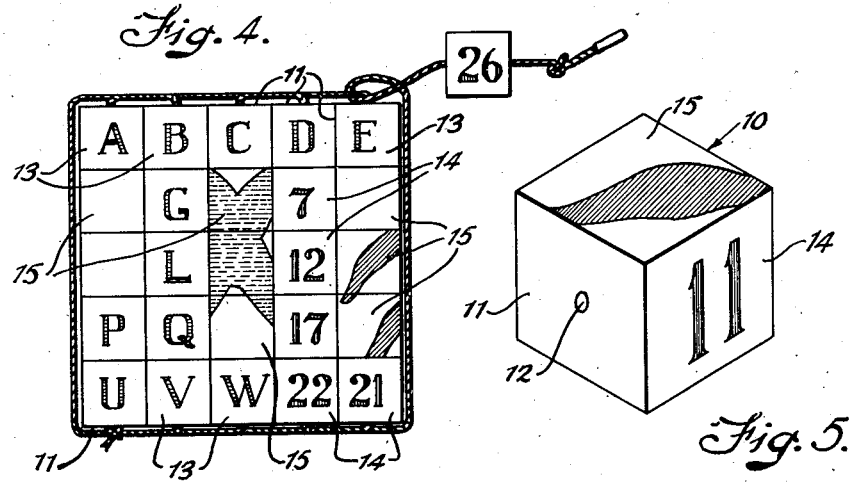
Inventor
Lloyd D. Myers.
By Clarence A. O'Brien
and Harvey B. Jacobson
Attorneys Patented Oct. 14, 1947

2,429,027

UNITED STATES PATENT OFFICE 2,429,027

EDUCATIONAL TOY

Lloyd D. Myers, El Paso, Tex.

Application March 24, 1945, Serial No. 584,557

4 Claims. (Cl. 35—35)

This invention relates to toys and more particularly to a device which combines the amusement features of a jig-saw puzzle with educational features by means of which a child may not only be amused but will, through contact with and manipulation of the toy, become familiar with the letters of the alphabet and various numerals.

The object of the invention is to combine amusement with education in such a manner that while at play a child will absorb some education.

Another object of the invention is to retain the parts of the device and prevent them from becoming scattered and lost so as to preserve the unitary nature of the device despite the fact that it is made up of a plurality of separate parts.

The above and other objects may be attained by employing this invention which embodies among its features a plurality of cubes each of which is provided with at least two blank faces and a central opening or aperture which opens outwardly through each of these blank faces, a flexible member threaded through the opening to retain the cubes and prevent scattering and indicia on certain other faces of the cubes so arranged as to produce pictorial representations of various objects and letters and numerals on the other faces of the cubes by means of which a child may become familiar therewith.

In the drawings:

Figure 1 is a front view of a rectangle formed of the cubes showing them arranged on their various axes to depict a pictorial representation of an airplane.

Figure 2 is a transverse sectional view taken on the line 2—2 of Figure 1.

Figure 3 is a view showing the parts separated,

Figure 4 is a view similar to Figure 1 showing the cubes turned at random, and

Figure 5 is a perspective view of one of the cubes disengaged from the retaining cord.

Referring to the drawings in detail my invention takes on the nature of a jig-saw puzzle as illustrated in Figure 1 and comprises a plurality of cubes each of which is designated generally 10 and constitutes a rectangular solid having six faces of equal area. Opposed faces 11 remain blank and the solid is pierced with a central aperture 12 which opens outwardly through each of the blank faces 11.

Imprinted on a face 13 of each and every cube 10 which lies perpendicular to the faces 11 is a letter of the alphabet and imprinted on the face 14 opposite the face 13 of the cube 10 is a numeral, while imprinted on the opposed faces 15 of each cube is a fragment of a picture depending on the pictorial representation which is to appear when the device is assembled.

The cubes are threaded upon a flexible member such as a cord 16 which is knotted or provided with any suitable stop 17 at each end to prevent withdrawal of the cubes from their relative positions once they have been assembled on the flexible member. As shown in Figure 3 the cubes are arranged on the flexible member 16 in series of five with the letters of the alphabet in one series being inverted with relation to the letters of the alphabet of the next series when the cord or flexible member 16 lies in a straight line but when the flexible member is bent as suggested in Figure 3 and as shown in Figure 4 the letters of the alphabet appear in sequence reading from left to right in the normal manner. Likewise the numerals appearing on the faces 14 opposite the faces 13 are so arranged on the cube faces that upon looking at the reverse side of Figure 4 the numerals will appear in sequence to be read from left to right in the ordinary manner.

Upon rotating the cubes on their axes about the flexible members 16 when they are arranged in the rectangular form shown in Figures 1 and 4, the picture fragments may be brought into view as illustrated in Figure 1 and fitted together to form, for instance, the picture of an airplane A with the other surrounding faces colored to indicate sky or other background, while on the reverse side of the rectangle shown in Figure 1 a pictorial representation of another object may be depicted.

In order to depict the twenty-six letters of the alphabet, an equal number of blocks is preferably employed. When arranging the blocks into a square or rectangle, to form pictures, as shown in Figures 1 and 4, obviously one or more blocks may not be needed, and this block or blocks may be segregated upon the string 16 as shown in Figures 1 and 4. Although the arrangement of blocks upon the string has, for convenience, been illustrated only in connection with forming a square of twenty-five units, it will be evident that various other arrangements can be employed.

It is obvious that such a device is subject to many modifications particularly as to the pictorial representations which may be employed and combines the amusing features of jig-saw puzzle with the educational features of the ordinary cubes commonly used for a child's amusement and education.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. An educational toy comprising a plurality of blocks, each block having a pair of opposed, parallel faces and a passage therethrough opening through said opposed faces, a flexible member threaded through the passages in all of said blocks, indicia comprising an alphabet letter on a third face of each block, indicia comprising a numeral on a fourth face of each block, and indicia on the remaining faces of each block forming a fragment of a design.

2. The combination of claim 1 wherein said blocks are arranged upon said flexible member in a plurality of different series, the indicia of each series being inverted relative to those of an adjacent series when all of said blocks are disposed in a straight line.

3. The combination of claim 2 wherein the toy includes twenty-six blocks, each series consisting of five consecutive blocks, whereby twenty-five of the blocks may be folded in five parallel series of five blocks to form a rectangle.

4. The combination of claim 1 wherein said blocks are arranged upon said flexible member in a plurality of different series, the indicia of each series being inverted relative to those of an adjacent series when all of said blocks are disposed in a straight line, said numerals being positioned on an opposite side of said block from said letters.

LLOYD D. MYERS.

REFERENCES CITED

The following references are of record in the file of this patent:

UNITED STATES PATENTS

| Number | Name | Date |
|---|---|---|
| 1,613,204 | Smith | Jan. 4, 1927 |
| 1,636,371 | Kenney | July 19, 1927 |
| 209,307 | Trickey | Oct. 22, 1878 |
| 2,063,287 | Aikins | Dec. 8, 1936 |